(12) United States Patent
Bruinsma et al.

(10) Patent No.: US 11,786,069 B2
(45) Date of Patent: Oct. 17, 2023

(54) BEVERAGE FLUID DISPENSING HEAD AND SYSTEM

(71) Applicant: Koninklijke Douwe Egberts B.V., Utrecht (NL)

(72) Inventors: Rodin Enne Bruinsma, Groningen (NL); Joeke Noordhuis, Groningen (NL); Johannes Rogier De Vrind, Haren (NL); Thijs Jelle Feenstra, Zuidhorn (NL); Gerbrand Kristiaan De Graaff, Hillegom (NL); Nicholas Andrew Hansen, Banbury (GB); Harrison Lloyd Woodall, Banbury (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 317 days.

(21) Appl. No.: 16/770,005

(22) PCT Filed: Dec. 7, 2018

(86) PCT No.: PCT/NL2018/050822
§ 371 (c)(1),
(2) Date: Jun. 4, 2020

(87) PCT Pub. No.: WO2019/112434
PCT Pub. Date: Jun. 13, 2019

(65) Prior Publication Data
US 2021/0315412 A1    Oct. 14, 2021

(30) Foreign Application Priority Data
Dec. 7, 2017 (NL) ..................................... 2020038

(51) Int. Cl.
*A47J 31/46* (2006.01)

(52) U.S. Cl.
CPC ..................................... *A47J 31/46* (2013.01)

(58) Field of Classification Search
CPC ....... A47J 31/46; A47J 19/145; E03C 1/0407; B65D 23/06; B65D 47/40; A47G 19/145; B67D 1/1256
(Continued)

(56) References Cited

U.S. PATENT DOCUMENTS

| 2006/0186134 A1* | 8/2006 | Medema | ................. A47J 31/46 222/21 |
| 2009/0134188 A1* | 5/2009 | Wilson | ................. B65D 47/40 222/546 |

(Continued)

FOREIGN PATENT DOCUMENTS

| CN | 1980851 A | 6/2007 |
| CN | 102574630 A | 7/2012 |

(Continued)

OTHER PUBLICATIONS

PCT; App. No. PCT/NL2018/050822, International Search Report and Written Opinion dated Feb. 22, 2019 (8 pgs.).

(Continued)

*Primary Examiner* — John J Norton
(74) *Attorney, Agent, or Firm* — Fitch, Even, Tabin & Flannery LLP

(57) ABSTRACT

A beverage fluid dispensing head comprising a housing; and a fluid track, at least in part, arranged inside the housing. The fluid track comprises: an inlet channel arranged for receiving a beverage fluid, such as coffee, from a beverage apparatus; a collection chamber, fluidly connected to the inlet channel, for receiving the beverage fluid therefrom; and at least one outlet channel. The at least one outlet channel is fluidly connected to the collection chamber for receiving the beverage fluid from the collection chamber. A downstream part (Continued)

of the at least one outlet channel is formed as a tongue-shaped flow guide which is downwardly directed for, in use, guiding the received beverage fluid and submitting the received beverage fluid therefrom in the form of an integral fluid beam for dispensing.

39 Claims, 9 Drawing Sheets

(58) Field of Classification Search
USPC ........................................................ 222/571
See application file for complete search history.

(56) References Cited

U.S. PATENT DOCUMENTS

| | | |
|---|---|---|
| 2010/0031826 A1 | 2/2010 | Doglioni Majer |
| 2012/0263833 A1 | 10/2012 | Wong |
| 2012/0266754 A1* | 10/2012 | Bambi ................ A47J 31/4464 99/293 |
| 2014/0137749 A1* | 5/2014 | Marchi .................. A47J 31/46 99/302 R |
| 2015/0040771 A1 | 2/2015 | Mori |
| 2016/0366905 A1* | 12/2016 | Diester ............... A47J 31/5253 |
| 2016/0374513 A1 | 12/2016 | Rego |
| 2017/0258261 A1 | 9/2017 | Clark |

FOREIGN PATENT DOCUMENTS

| | | | |
|---|---|---|---|
| CN | 103767544 | 5/2014 | |
| CN | 203662563 U | 6/2014 | |
| CN | 204445431 | 7/2015 | |
| DE | 4037673 A1 * | 6/1992 | ........... A47G 19/145 |
| EP | 2543289 | 1/2013 | |
| FR | 2338027 | 8/1977 | |
| RU | 2436489 | 12/2011 | |
| RU | 2620957 | 5/2017 | |
| WO | 2004060121 | 7/2004 | |
| WO | 2011048485 | 4/2011 | |

OTHER PUBLICATIONS

English translation of Offical Action of the Substantive Examination, dated Mar. 1, 2022; Russian Application No. 2020122246 (6 pgs.).

English translation of Search Report, dated Mar. 1, 2022; Russian Application No. 2020122246 (2 pgs.).

* cited by examiner

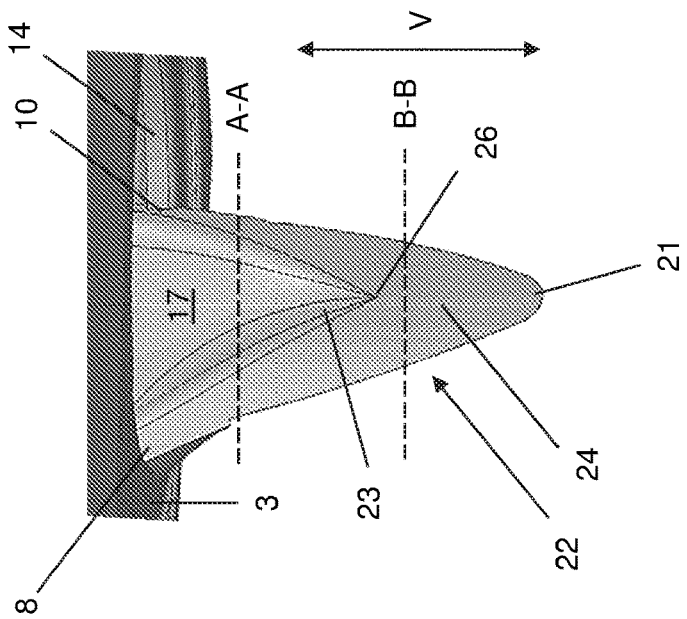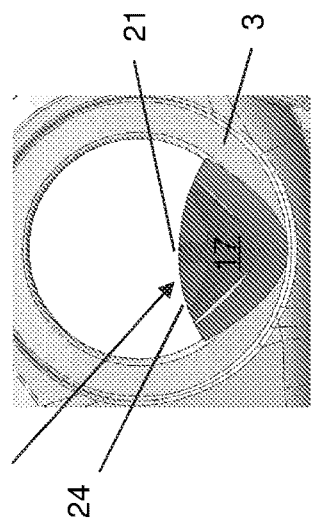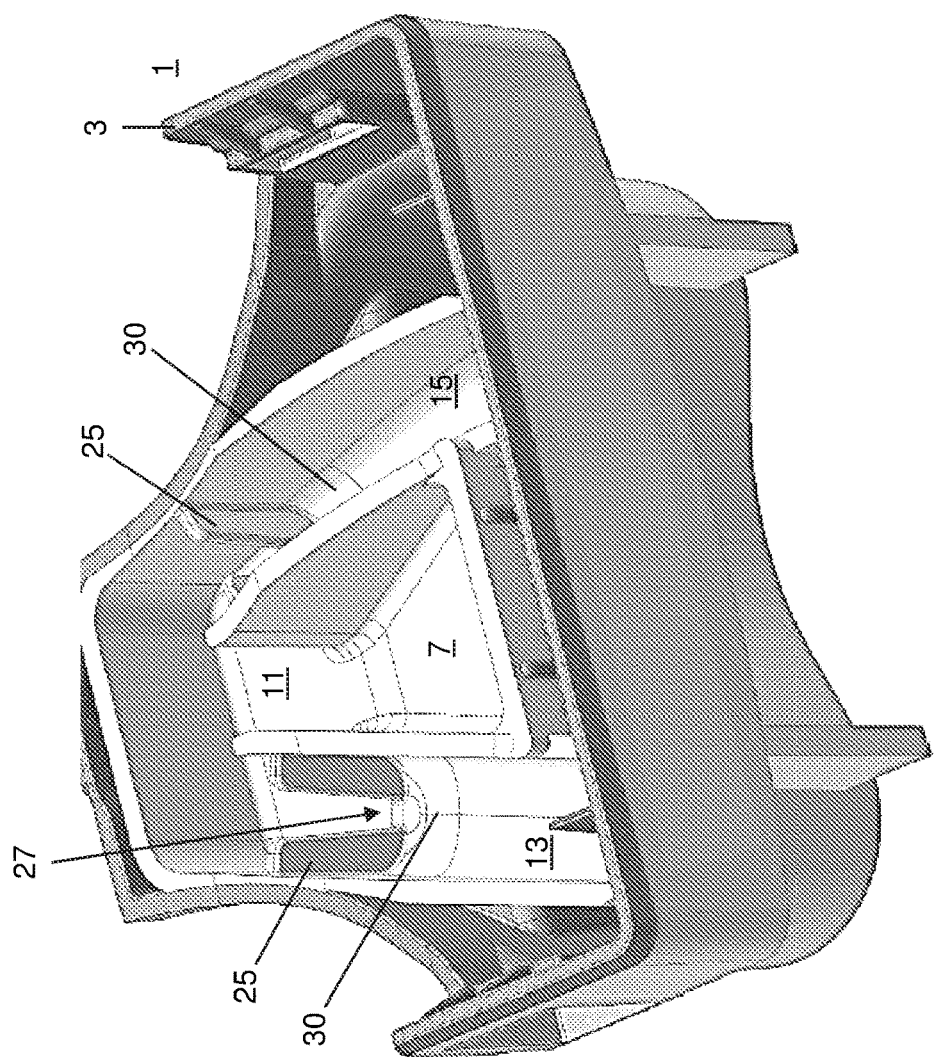
FIG. 3A
FIG. 3B
FIG. 2

BEVERAGE FLUID DISPENSING HEAD AND SYSTEM

CROSS REFERENCE TO RELATED APPLICATIONS

This application is a U.S. national phase application of International Application No. PCT/NL2018/050822, filed Dec. 7, 2018, which claims benefit from Netherlands Application 2020038, filed Dec. 7, 2017, which are each hereby incorporated herein by reference in their entirety.

FIELD

The invention relates to a beverage fluid dispensing head and a system of a beverage apparatus and such a dispensing head. The dispensing head comprising a housing and a fluid track. The fluid track is at least partially arranged inside the housing. The fluid track comprises an inlet channel arranged for receiving a beverage fluid, such as coffee, from a beverage apparatus. The fluid track further comprises a collection chamber, fluidly connected to the inlet, for receiving the beverage fluid from the inlet. The fluid track also comprises at least one outlet channel. The at least one outlet channel is fluidly connected to the collection chamber for receiving the beverage fluid therefrom.

BACKGROUND

In existing beverage apparatuses, such as coffee apparatuses, a beverage is provided by a beverage preparation unit. The beverage is commonly delivered to a beverage receptacle via at least one outlet channel of a dispensing head. The beverage preparation unit of a portioned existing espresso appliance will for example provide coffee at a flow of 0.4 to 6 ml/s and above. The flow is submitted via the at least one outlet channel into at least one beverage receptacle in the form of an outlet stream. Typically, the flow outlet stream is not submitted over a distance longer than 15 cm into the beverage receptacle. Beverages varying between 30-100 ml are generally dispensed over a dispensing period of 10-45 seconds in existing beverage apparatuses.

A problem is that existing beverage apparatuses sometimes experience outlet streams which are discontinuous in that in part of the streams interruptions occur, such as through the collapse of part of the stream into drops. Continuity reads on the integral nature of the outlet stream as a fluid beam. The disintegration of the fluid beam over any part of its length before a beverage is entirely dispensed is considered a discontinuity. Any other form of interruption during dispensing, such as the cessation of the submission of the outlet stream from an outlet is also considered a discontinuity. In existing apparatuses the geometry of the outlet channel is such that an outlet stream having a low flowrate, such as anywhere below 2 ml/s can become discontinuous. A discontinuous outlet stream may negatively affect the beverage and can be experienced as undesirable for the user.

SUMMARY

Accordingly, it is an object of the present invention to propose a dispensing head and a system with such a dispensing head and a beverage apparatus which prevents outlet streams from being discontinuous at low flowrates, such as between 0.4-6 ml, preferably 0.5-6 ml/s.

To this end the invention provides a beverage fluid dispensing head and system as defined in one ore more of the appended claims. The system can be suitable for producing coffee, milk, chocolate, tea, or water.

According to the invention there is provided a beverage fluid dispensing head characterized in that a downstream part of the at least one outlet channel is formed as a tongue-shaped flow guide. The tongue-like part can resemble an extended human tongue. A tongue may more in particular be seen as a chute comprising an upper surface for guiding a fluid flow, wherein the upper surface at least comprises a first surface curvature in a direction of fluid flow and a second surface curvature which is orthogonal to the first surface curvature, wherein the first surface curvature is convex, and the second surface curvature is concave and, wherein a downstream end of the chute may form a tip. The tongue-shaped flow guide is downwardly directed for, in use, guiding the received beverage fluid and submitting the received beverage fluid therefrom in the form of an integral fluid beam for dispensing.

Optionally, the housing and the fluid track are formed from separate parts. This simplifies manufacturing activities. More preferably such that the parts are suitable for being assembled to form the dispensing head. As such, the dispensing head has a modular structure which allows for the replacement of the fluid track without replacing the entire dispensing head. Thus, reducing the cost of maintenance.

Optionally, the flow guide is arranged for, in use, receiving beverage fluid with an average flowrate within a range of flowrates. The average flowrate here can be seen as the volume of a beverage over its dispensing time divided by the number of outlet channels. The range of flowrates is 0.4-6 ml/s, preferably 0.5-6 ml/s, more preferably 0.5-2 ml/s. A benefit is that a thin fluid beam can be formed which has a small impact area in a beverage receptacle. This prevents the undesired formation of plunge bubbles and the washing out of color from a foam layer which may form on a dispensed beverage.

Optionally, the tongue-shaped flow guide has a first and a second upstanding edge. Together the upstanding edges taper, at least in part, towards the distal end of the tongue-shaped flow guide. It can be understood that tapering can be seen as the decreasing of width of the upstanding edges towards the distal end of the tongue-shaped flow guide. Optionally, a total width of the tongue on a forward direction may also decreases towards the distal end of the tongue-shaped flow guide.

Optionally, the tongue-shaped flow guide has a first and a second upstanding edge. Each of the upstanding edges can be beveled or kinked towards the distal end of the tongue-shaped flow guide. A benefit is that this reduces disturbances in the passing fluid in that the upstanding walls shield an upstream fluid flow from environmental influences such as air displacement.

Optionally, the tongue-shaped flow guide has a first and a second upstanding edge. The upstanding edges can converge towards a distal end of the tongue-shaped flow guide. This distal end of the tongue-shaped flow guide can be formed as a single tip. A benefit is that this allows a stream to collect at single point.

Optionally, the tongue-shaped flow guide has a first fluid guiding surface which is concave when viewed in a first horizontal cross-section, preferably with only one minimum in its horizontal curvature. Concave can here be understood to signify an inward curvature of the first fluid guiding surface. A benefit is that this prevents, or at least substantially reduces, an outlet stream from forming drops at the interface from which it is projected.

Optionally, the tongue-shaped flow guide has a first and a second upstanding edge which are merged downstream of the first fluid guiding surface. The upstanding edges can form a second fluid guiding surface which is convex. Convex here can be understood to signify an outward bulging of the second fluid guiding surface. The convex shape allows for the wetting of the back of a downstream end of the tongue-like part during intended use. This may influence the angle with which the outlet stream is projected from the tongue-like part. Optionally, the first fluid guiding surface is nested in the second fluid guiding surface.

Optionally, the first fluid guiding surface converges to a single point on a beverage fluid guiding face of the tongue-shaped flow guide. The single point is upstream of the distal end of the tongue-shaped flow guide. This allows a pre-convergence of a fluid flow to reaching the distal end of the tongue-shaped flow guide for dispensing as a stream. This reduces disturbances in the flow which can lead to the collapse of part of the outlet stream into droplets.

Optionally, the tongue-shaped flow guide has a first and a second upstanding edge. Each of the upstanding edges runs along the length of the tongue-shaped flow guide and extends, at least in part, in a non-vertical direction with respect to the first fluid guiding surface. A benefit is that the fluid flow on the tongue-shaped flow guide can be shielded from environmental influences.

Optionally, the housing is provided with at least one opening in a bottom thereof. The at least one tongue-shaped flow guide extends through the at least one opening. The shortest distance between the at least one opening and the distal end of the tongue-shaped flow guide is between 3-15 mm, preferably 5-11 mm, and more preferably 5 mm. The opening can be defined by an opening edge in the bottom of the housing. The opening edge encloses a surface from which distance measurement can be made.

Optionally, the first fluid guiding surface terminates at an angle between 0-10 degrees from vertical in a forward direction, and preferably 0 degrees. A benefit is that a forward, or non-vertical, velocity component can be introduced into an outlet stream. Such a velocity component may be used to aim the stream or to cancel out an opposing velocity component, such as introduced by surface interaction effects between the beverage fluid and part tongue-shaped flow guide.

Optionally, the second fluid guiding surface terminates at an angle between 0-10 degrees from vertical, such as opposite a forward direction. A benefit is that this can reduce the forward velocity of the outlet stream through surface interactions.

Optionally, the at least one outlet channel is integral with the tongue-shaped flow guide. A benefit is that this prevents interfaces between components, which reduces disturbances in the outlet stream.

Optionally, part of the at least one outlet channel is formed as a chute having a downwards curvature toward the tongue-shaped flow guide. The at least one outlet channel is preferably also curved in its cross-section traverse a flow direction of the at least one outlet channel.

Optionally, the at least one outlet channel comprises a first flow restriction. The first flow restriction comprises a first through flow opening. A benefit is that this allows the distributor to act as a buffer area to allow beverage to come to rest which reduces disturbances and allows for a less variation in flowrate over the dispensing time. Optionally, the at least one outlet channel comprises a first and a second outlet channel. This further allows parallel dispensing into separate cups. In which case the first flow restriction allows for a more equal distribution of beverage over the outlet channels.

Optionally, the first flow restriction is a first upstanding wall which extends traverse a flow direction, wherein preferably an outer surface of the first upstanding separation wall which faces an oncoming beverage fluid flow is angled between 2-5 degrees from vertical, wherein preferably at least a portion of the contour of the first through flow opening is defined by the first flow restriction. This allows for a more equal distribution of beverage over a plurality of outlet channels. Another benefit is that this reduces the disturbance in the fluid flow.

Optionally, the first through flow opening is slit-shaped having a width in the range of 2.0-6.0 mm, wherein preferably the first trough flow opening extends upwardly from a bottom edge of the first flow restriction, wherein more preferably the first through flow opening extends to a top edge of the first flow restriction. This allows for a higher residence time of beverage fluid in the collection chamber, which reduces disturbances in the beverage fluid and can allow for a more equal distribution of beverage over a plurality of outlet channels. More preferably, the width of the first through flow opening increases in an upward direction from a width of 2.0-3.0 mm to a width of 5.0-6.0 mm. A benefit is that this prevents the flow resistance from linearly increasing with respect to the flow rate of a beverage flow, which prevents clogging effects.

Optionally, the at least one outlet channel comprises a second flow restriction, wherein the second flow restriction comprises a through flow opening, and wherein the second flow restriction is preferably arranged downstream of the first flow restriction. A benefit is that an overflow of the first flow restriction can be buffered in the outlet channel such as to reduce disturbances in the outlet stream.

Optionally, the second flow restriction is a second upstanding wall which extends traverse a flow direction, wherein an outer surface of the second upstanding separation wall which faces an oncoming beverage fluid flow is preferably angled between 2-5 degrees from vertical, wherein preferably at least a portion of the contour of the second through flow opening is defined by the second flow restriction. Optionally, the second through flow opening is slit-shaped having a width in the range of 2.0-6.0 mm, wherein preferably the second trough flow opening extends upwardly from a bottom edge of the second flow restriction, wherein more preferably the through flow opening extends to a top edge of the second flow restriction. Even more preferably, the width of the first through flow opening increases in an upward direction from a width of 2.0-3.0 mm to a width of 5.0-6.0 mm.

Optionally, the tongue-shaped flow guide comprises a further flow restriction, wherein the further flow restriction comprises a further through flow opening. This allows a forward, or non-vertical, velocity of a fluid flow through the outlet channel to be reduced. This prevents an outlet stream to arch from the tongue-shaped flow guide.

Optionally, the further flow restriction is a further upstanding wall which extends traverse a flow direction. An outer surface of the further upstanding separation wall which faces an oncoming beverage fluid flow is optionally angled between 0-10 degrees from vertical. Optionally, the further through flow opening is slit-shaped having a width in the range of 1.2-1.8 mm. Preferably, at least a portion of the contour of the further through flow opening is defined by the further flow restriction. Optionally, the further trough flow opening extends upwardly from a bottom edge of the further flow restriction, wherein more preferably the through flow opening extends to a top edge of the further flow restriction.

Optionally, the housing is provided with a skirt element, such as formed by an upstanding edge which extends outwardly from the housing and which is arranged around the tongue-shaped flow guide. Preferably, the skirt element extends to below the distal end of the tongue-shaped flow guide. A benefit is that the tongue-shaped flow guide is protected from external influences. Preferably, the skirt is integral with the housing and made of the same material.

Optionally, the inner surface of the skirt element and the tongue-shaped flow guide are spaced apart such as to be fluidly separated. Preferably, the edges which run along the length of the tongue-shaped flow guide are spaced a minimal distance away from the skirt element in order to prevent the accidental bridging of a beverage fluid from the flow guide to the skirt element. A benefit is that this prevents sudden and repeated changes in direction of the fluid beam during dispensing. These sudden changes may occur as fluid bridges from the flow guide to the skirt element.

According to a further aspect of the invention a system is provided. The system comprises a dispensing head according to invention and a coffee apparatus with a beverage preparation unit for providing a beverage fluid, such as coffee, to the dispensing head.

Optionally, the beverage preparation unit is arranged to receive a coffee pad for brewing coffee at a pressure that is about 0.7-3 bar above atmospheric pressure or that the beverage preparation unit is arranged to receive a coffee capsule for brewing coffee at a pressure that is about 1-20 bar above atmospheric pressure.

BRIEF DESCRIPTION OF THE FIGURE

FIG. 2 shows a detailed perspective view of the dispensing head according to FIGS. 1A-1C;

FIG. 3A shows a detailed perspective view of a tongue-like part of an outlet channel according to FIG. 1A-1C and FIG. 2;

FIG. 3B shows a detailed bottom view of a tongue-like part of an outlet channel according to FIG. 1A-1C, FIG. 2 and FIG. 3A;

DETAILED DESCRIPTION

Figure 1A:
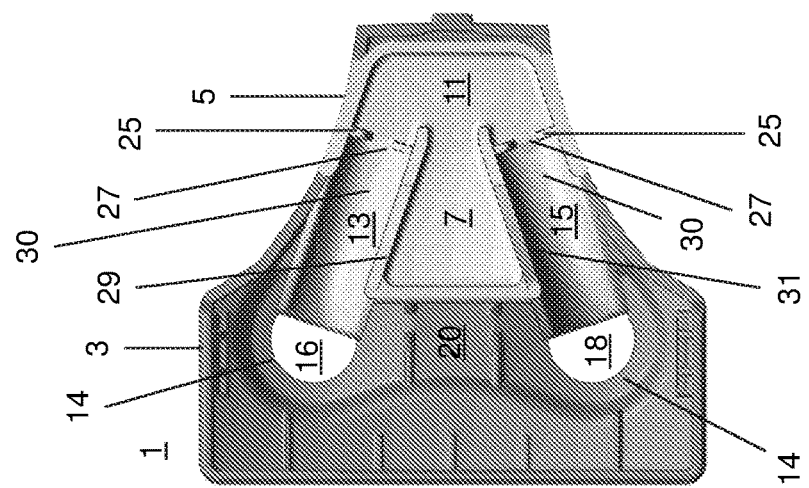
FIGS. 1A-1C show respectively a front view, a side view and a top view of a beverage fluid dispensing head according to the invention.
Figure 1B:
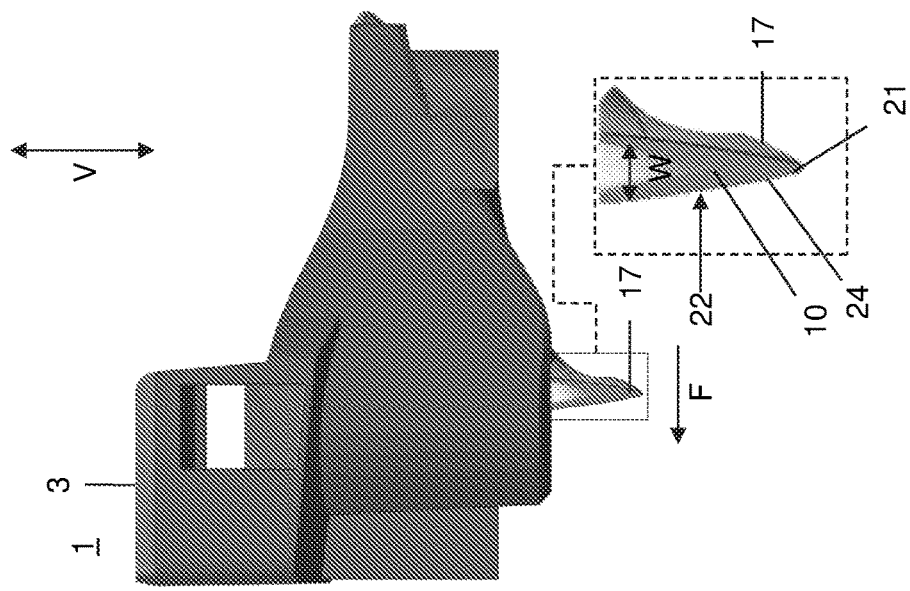
Figure 1C:
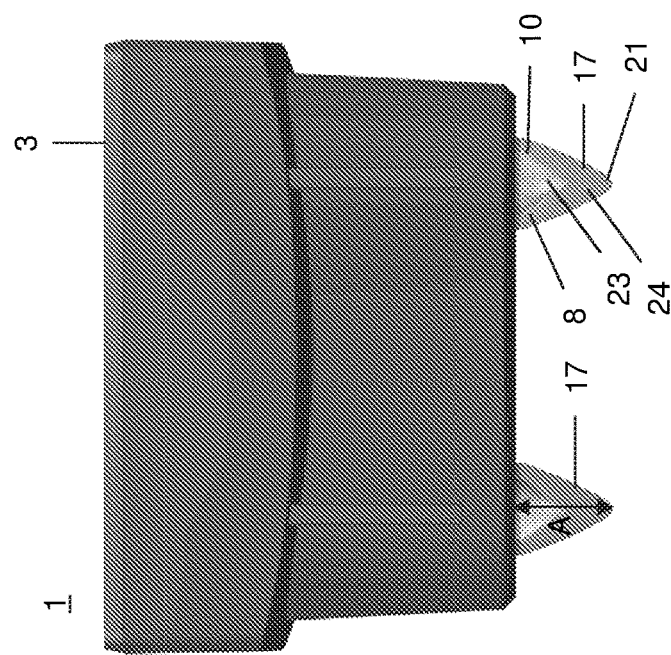

FIGS. 1A-1C show respectively a front view, a side view and a top view of a beverage fluid dispensing head 1 according to the invention. The dispensing head 1 comprises a housing 3 and a fluid track 5. The housing 3 can be made of a sturdy plastic material, such as PE, PET, HDPE, LDPE, PP, POM and other polymer-types or a blend thereof. The fluid track 5 can also be made of such plastic material. The fluid track 5 is shown in FIG. 1C, which shows a top view of the dispensing head 1. The fluid track 5 is arranged inside the housing 3. The housing 3 and the fluid track 5 are preferably formed as separate parts. However, the housing 3 and fluid track 5 may alternatively also be formed as integral parts. The fluid track 5 comprises an inlet channel 7 arranged for receiving a beverage fluid, such as coffee, from a beverage apparatus 9 (shown in FIG. 4). The fluid track 5 further comprises a collection chamber 11, fluidly connected to the inlet channel 7, for receiving the beverage fluid from the inlet channel 7. From the collection chamber 11 fluids can be distributed. The fluid track 5 further also comprises at least one outlet channel, such as a first 13 and a second outlet channel 15. Each outlet channel 13, 15 is fluidly connected to the collection chamber 11 for receiving the beverage fluid from the collection chamber 11. Each outlet channel 13, 15 can extend outward through the housing 3. In one example the housing can be provided with an opening 16, 18 for each outlet channel 13, 15. Each of the outlet channels 13, 15 at a downstream end thereof comprises a tongue-shaped flow guide 17 for guiding the beverage fluid and submitting the beverage fluid therefrom for dispensing, such as into a beverage receptacle (not shown, but customary). The housing 3 can be provided with the openings 16, 18 in a bottom 20 thereof such that the tongue-shaped flow guide 17 of each outlet channel 13, 15 can extend downwardly and out through the bottom 20 of the housing 3. Each opening 16, 18 in the bottom can be defined by an opening edge 14 in the bottom 20. The tongue-shaped flow guide 17 can resemble an extended human tongue. A detailed perspective view of the tongue-shaped flow guide 17 according to FIG. 1A-1C is shown in FIG. 3A. The shortest distance A, shown in FIG. 1A, between the opening 16, 18 and the distal end 21 of the corresponding tongue-shaped flow guide 17 is 5 mm. However this can also be in the range of 3-15 mm or more preferably in the range of 5-11 mm. The tongue-shaped flow guide 17 has a first and a second upstanding edge 8, 10. Together the two upstanding edges 8, 10 taper, at least in part, towards the distal end 21 of the tongue-shaped flow guide 17. This tapering can be observed in that the width W of the upstanding edges 8, 10 decreases towards the distal end 21 of the tongue-shaped flow guide 17. The upstanding edges 8, 10 can converge towards a distal end 21 of the tongue-shaped flow guide 17. The distal end 21 of the tongue-shaped flow guide 17 can be formed as a single tip. The tongue-shaped flow guide 17 has a first fluid guiding surface 23 which is concave, when viewed in a first horizontal cross-section A-A, shown in FIG. 3A. Preferably, the fluid guiding surface 23 has only one minimum in its horizontal curvature, when viewed in any horizontal cross-section. The transition between the upstanding edges 8, 10 and the first horizontal surface can be smooth. The first and a second upstanding edge 8, 10 can be merged downstream of the first fluid guiding surface 23, preferably forming the distal end 21 of the tongue-shaped flow guide 17. The upstanding edges 8, 10 can also form a second fluid guiding surface 24 which is convex, such as when viewed in a second horizontal cross-section B-B, shown in FIG. 3B, which is downstream from the first horizontal cross-section. Preferably, as seen from FIG. 3A, the first fluid guiding surface 23 is nested in the second fluid guiding surface 24. The first fluid guiding surface 23 can converge to a single point 26 on a beverage fluid guiding face 22 of the tongue-shaped flow guide 17. The single point 26 is upstream of the distal end 21 of the tongue-shaped flow guide 17. The first fluid guiding surface 23 can terminate downstream at an angle between 0-10 degrees from vertical and preferably 0 degrees, such as in a forward direction F. The second fluid guiding surface terminates downstream at an angle between 0-10 degrees from vertical, such as opposite the forward direction F.

FIG. 2 shows a detailed perspective view of the dispensing head 1 according to FIGS. 1A-1C. Preferably the fluid track 5 and the housing 3 are formed of a food grade plastic such as PET, HDPE, LDPE, PS, POM or PP or any other food grade polymer or composite of food grade polymers. The fluid track 5 and the housing 3 can be thermally molded. Optionally, the fluid track 5 and the housing 3 are integrally formed by a common structure. Alternatively, the fluid track 5 and the housing 3 are separate structures which can be connected to each other to form the dispensing head 1. The tongue-shaped flow guide 17, shown in FIG. 3A, is integral with its respective outlet channel 13, 15. Part of each of the first and second outlet channel 13, 15 is formed as a chute 30 having a downwards curvature toward the tongue-shaped flow guide 17. Each of the outlet channels 13, 15 is preferably also curved in its cross-section traverse a flow direction of the beverage fluid therein. Beverage fluid, such as coffee, in the fluid track 5 flows only under the influence of gravity. Each of the outlet channels 13, 15 comprises a first flow restriction 25, wherein the first flow restriction comprises a first through flow opening 27. The first flow restriction 25 can be integral with the fluid track 5. The first flow restriction 25 can be a first upstanding wall which extends traverse the flow direction in the corresponding outlet channel 13, 15. The outer surface of the first upstanding separation wall which faces an oncoming beverage fluid flow is angled between 2-5 degrees from vertical, in intended use. The contour of the first through flow opening 27 is defined by the first flow restriction 25 such that the first through flow opening 27 is slit-shaped having a width in the range of 1.2-1.8 mm. The width of the first through flow opening 27 increases in an upward direction. The first trough flow opening 27 can further be seen to extend upwardly from a bottom edge of the first flow restriction to a top edge of the first flow restriction.

Figure 4:
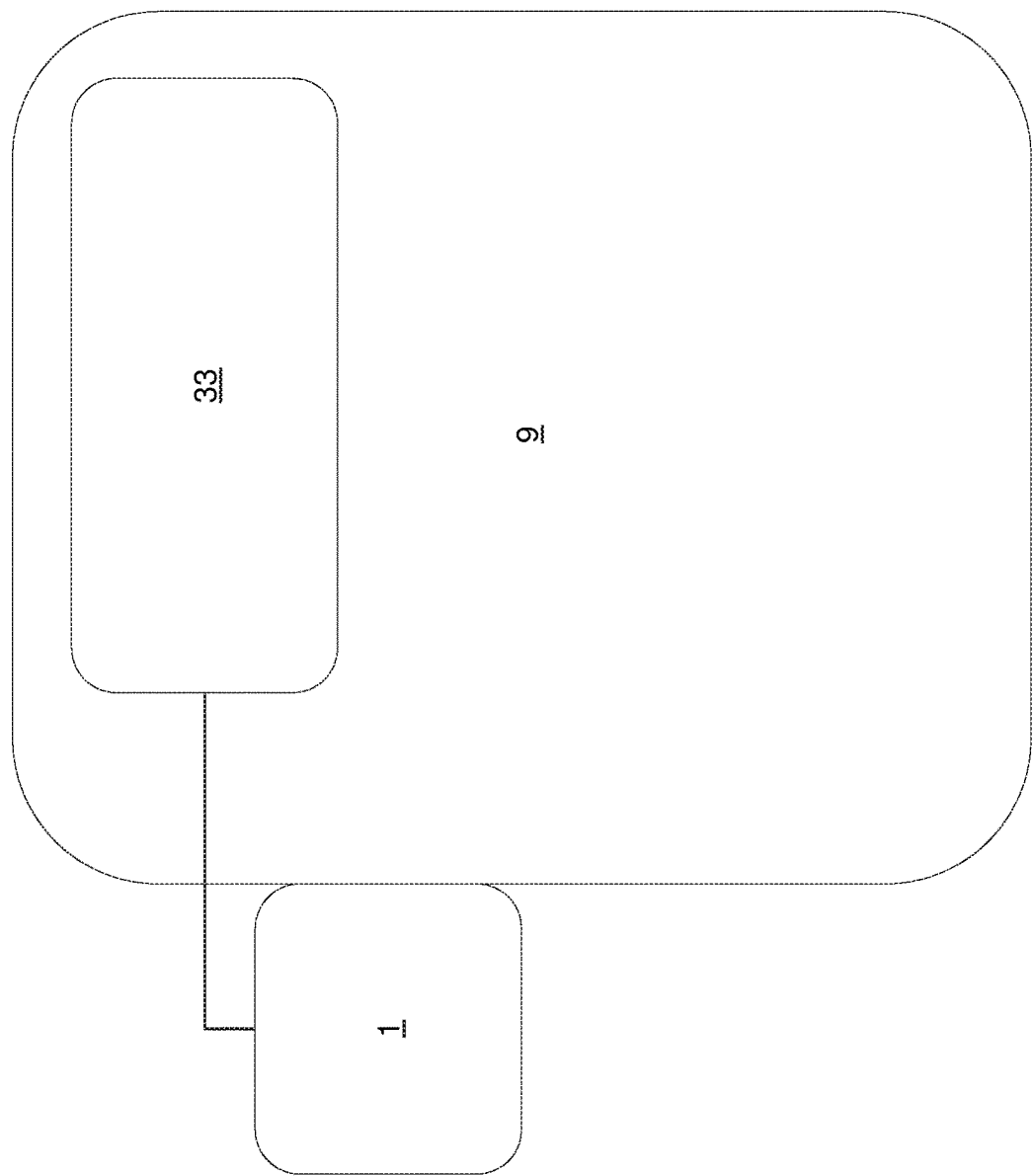
FIG. 4 shows a schematic view of a system with the beverage dispensing head according to the invention.

FIG. 4 shows a schematic view of a system 100 comprising the coffee apparatus 9 with a beverage preparation unit 33 for providing a beverage fluid, such as coffee or warm water, to the dispensing head 1. In particular the coffee apparatus 9 is arranged to deliver the beverage fluid to the inlet channel 7. To this end the beverage preparation unit 33 and the dispensing head 1 are fluidly connected. The beverage preparation unit 9 can be arranged to receive a coffee pad for brewing coffee at a pressure that is about 0.7-3 bar above atmospheric pressure or that the beverage preparation unit is arranged to receive a coffee capsule for brewing coffee at a pressure that is about 1-20 bar above atmospheric pressure. To this end the beverage preparation machine 9 can comprise conventional components of a coffee machine. The dispensing head 1 and the coffee apparatus 9 may be arranged to be detachably connected to each other. The beverage preparation machine 9 can be a time controlled beverage preparation machine, which is arranged to operate a predetermined amount of time for dispensing.

Figure 5A:
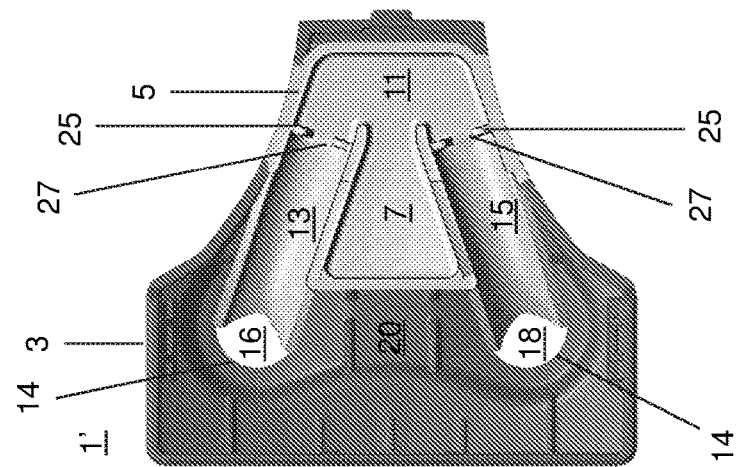
FIG. 5A-5C show respectively a front view, a side view and a top view of another beverage fluid dispensing head according to the invention.
Figure 5B:
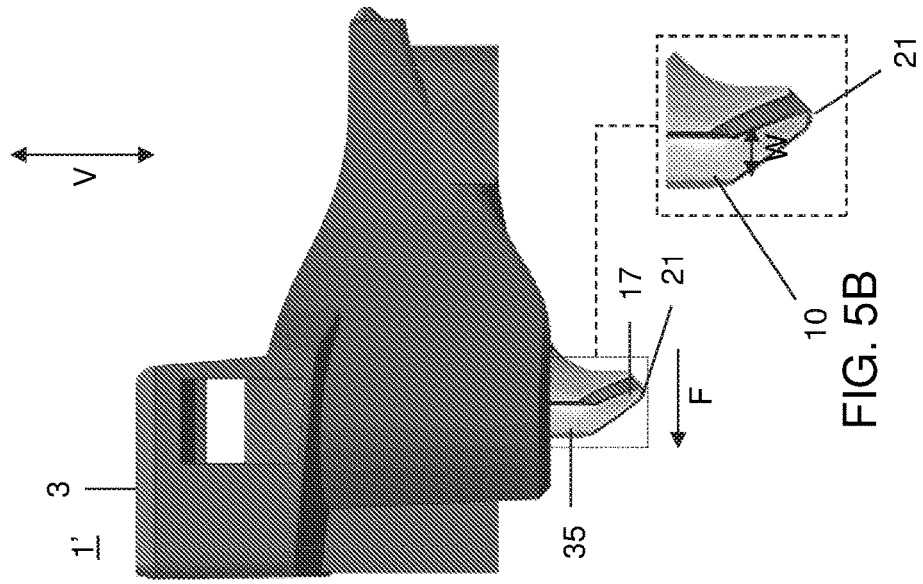
Figure 5C:
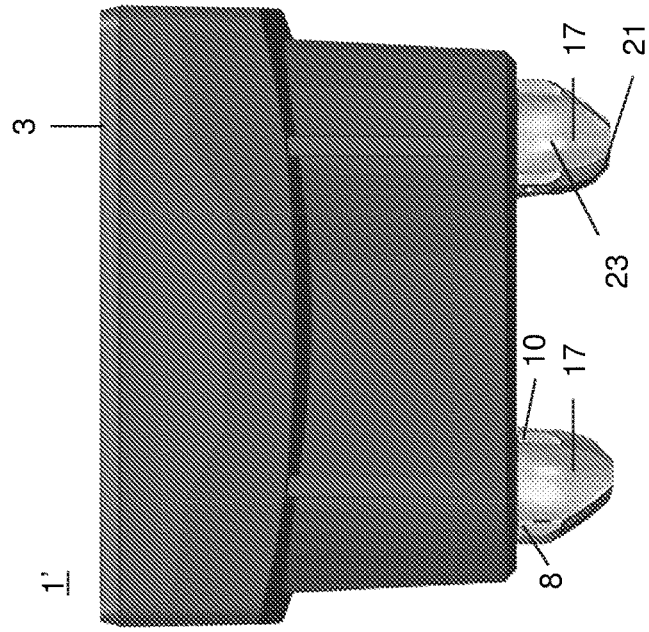

FIGS. 5A-5C show a front view, a side view and a top view of another embodiment of a dispensing head 1' of the beverage apparatus according to FIGS. 1A-1C. In the preceding Figures and FIGS. 5A-5C corresponding elements are provided with the same reference number. Hereafter only differences between the dispensing head 1 of FIGS. 1A-1C and the dispensing head 1' of FIGS. 5A-5C are discussed. In this embodiment each of the upstanding edges 8, 10 are beveled, or kinked, towards a distal end 21 of the tongue-shaped flow guide 17. Each of the upstanding edges 8, 10 runs along the length of the tongue-shaped flow guide 17 and extend, at least in part, in a non-vertical direction, such as the forward direction F, with respect to the first fluid guiding surface 23. A second fluid guiding surface 24 is not formed by the upstanding edges 8, 10.

Figure 6C:
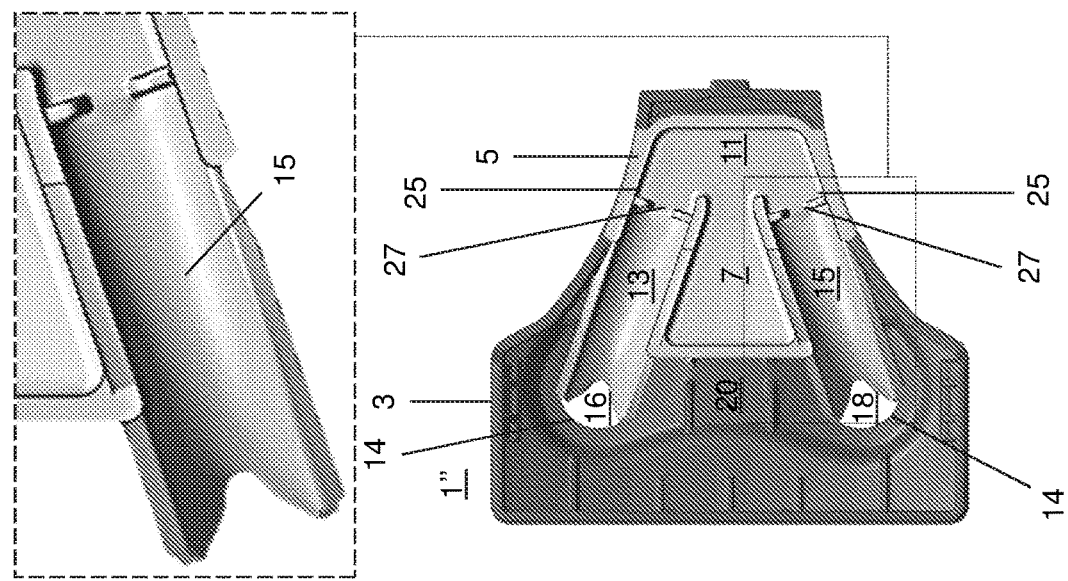
FIGS. 6A-6C show respectively a front view, a side view and a top view of another beverage fluid dispensing head according to the invention.
Figure 6B:
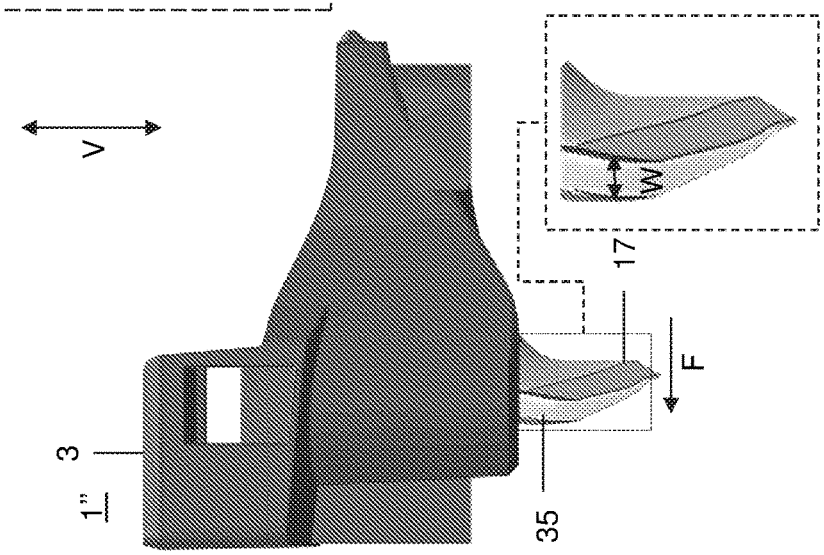
Figure 6A:
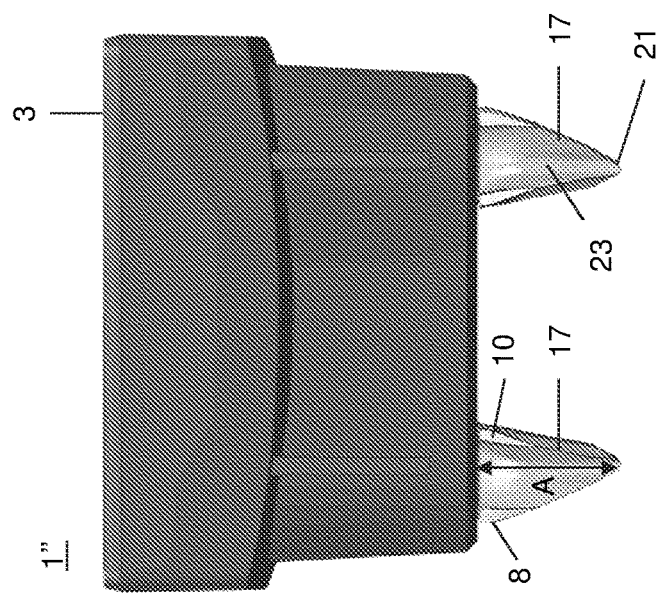

FIGS. 6A-6C show a front view, a side view and a top view of another embodiment of a dispensing head 1" of the beverage apparatus according to FIGS. 1A-1C. In the preceding Figures and FIGS. 6A-6C corresponding elements are provided with the same reference number. Hereafter only differences between the dispensing head 1 of FIGS. 1A-1C and the dispensing head 1" of FIGS. 6A-6C are discussed. In this embodiment each of the upstanding edges 8, 10 runs along the length of the tongue-shaped flow guide 17 and extend, at least in part, in a non-vertical direction, such as the forward direction F, with respect to the first fluid guiding surface 23. A second fluid guiding surface 24 is not formed by the upstanding edges 8, 10. The first fluid guiding surface can become substantially V-shaped in horizontal cross-section. The shortest distance A between the opening 16, 18 and the distal end of the tongue-shaped flow guide 21 is 11 mm.

Figure 7:
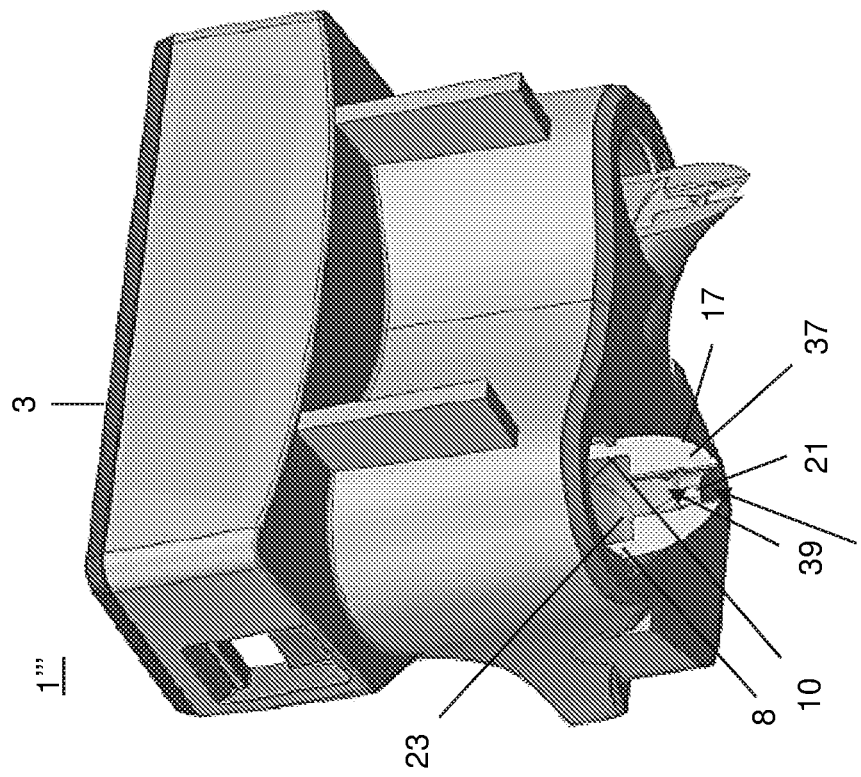
FIG. 7 shows a detailed perspective view of another beverage fluid dispensing head according to the invention.

FIG. 7 shows a perspective view of another embodiment of a dispensing head 1''' of the beverage apparatus according to FIGS. 1A-1C. In the preceding Figures and FIG. 7 corresponding elements are provided with the same reference number. Hereafter only differences between the dispensing head 1 of FIGS. 1A-1C and the dispensing head 1''' of FIG. 7 are discussed. In this embodiment each of the outlet channels 13, 15 can comprise a further flow restriction 37. The further flow restriction 37 comprises a further through flow opening 39. The further flow restriction 37 can be a further upstanding wall which extends traverse the flow direction in the respective outlet channel 13, 15. Preferably, the an outer surface of further upstanding separation wall which faces an oncoming beverage fluid flow is angled between 0-10 degrees from vertical. The further through flow opening 39 is slit-shaped having a width in the range of 1.2-1.8 mm. The width of the further through flow opening increases in an upward direction. The further trough flow opening can extend upwardly from a bottom edge of the further flow restriction 37. The through flow opening 39 may also extend to a top edge of the further flow restriction 37. The first fluid guiding surface 23 may comprise a recess 41 at a downstream end thereof. A second fluid guiding surface 24 is not formed by the upstanding edges 8, 10.

Figure 8:
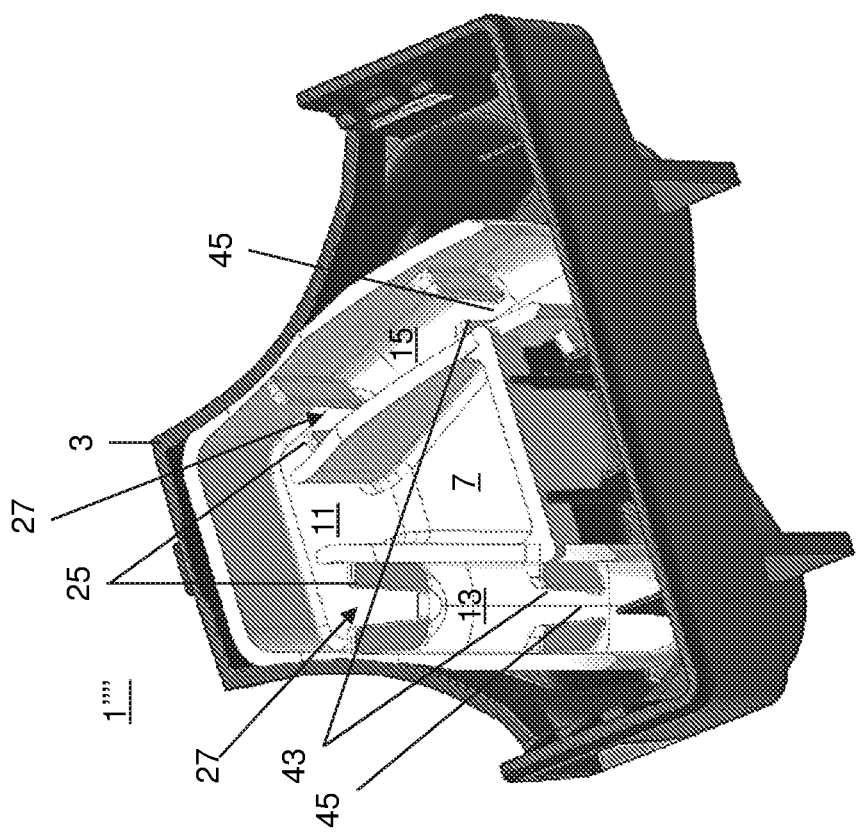
FIG. 8 shows a detailed perspective view of another beverage fluid dispensing head according to the invention.

FIG. 8 shows a perspective view of another embodiment of a dispensing head 1"" of the beverage apparatus according to FIGS. 1A-1C. In the preceding Figures and FIG. 8 corresponding elements are provided with the same reference number. Hereafter only differences between the dispensing head 1 of FIGS. 1A-1C and the dispensing head 1"" of FIG. 8 are discussed. In this embodiment each of the outlet channels 13, 15 can comprise a second flow restriction 43. The second flow restriction 43 can comprise a through flow opening 45. The second flow restriction 43 can be arranged downstream of the first flow restriction 25. The second flow restriction 43 does not exclude the possibility of a further flow restriction 37. The second flow restriction 43 can be a second upstanding wall which extends traverse the flow direction in the respective outlet channel. An outer surface of the second upstanding separation wall which faces an oncoming beverage fluid flow can be angled between 2-5 degrees from vertical. The contour of the second through flow opening is defined by the second flow restriction such that the second through flow opening can be slit-shaped having a width in the range of 1.2-1.8 mm. The second trough flow opening can extend upwardly from a bottom edge of the second flow restriction. The width of the second through flow opening increases in an upward direction. The through flow opening can extend to a top edge of the second flow restriction 43. The second flow restriction can be combined with any preceding embodiment.

Figure 9:
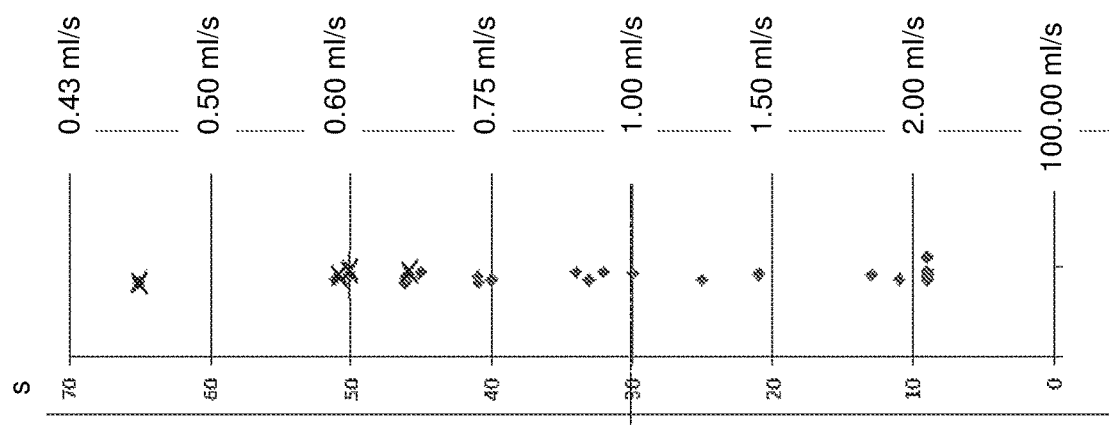
FIG. 9 shows a graph with test results.

FIG. 9 shows a graph with test results which are reflective of the use of the dispensing head 1 of FIGS. 1A-1C. In this test a coffee beverage of 60 ml has been dispensed using the dispensing head 1 of FIGS. 1A-1C. The beverage was dispensed into a beverage receptacle placed directly below the beverage dispensing head, such that the outlet streams would be between 5-15 cm during dispensing. On the left hand of the y-axis the amount of seconds in which the beverage was dispensed is shown. On the right hand of the y-axis the flowrate of each outlet stream is shown. Experiments are represented by the symbol ◊. Experiments which showed dripping during dispensing were marked with an "X".

Figure 10:
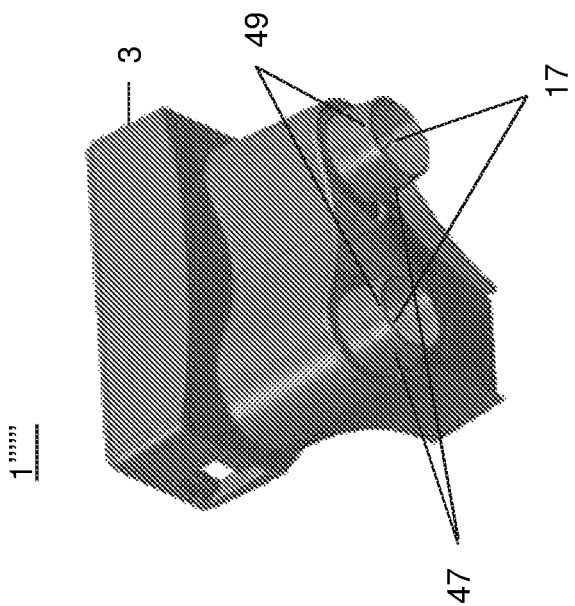
FIG. 10 shows a detailed perspective view of another beverage fluid dispensing head according to the invention.

FIG. 10 shows a perspective view of another embodiment of a dispensing head 1''' of the beverage apparatus according to FIGS. 1A-1C. In the preceding Figures and FIG. 10 corresponding elements are provided with the same reference number. Hereafter only differences between the dispensing head 1 of FIGS. 1A-1C and the dispensing head 1''' of FIG. 10 are discussed. In FIG. 10 the first flow restriction 25 defines the contour of the first through flow opening 27 such that the first through flow opening 27 is slit-shaped, wherein the width of the first through flow opening 27 increases in an upward direction from a first width of 2.5 mm to a second width of 5.4 mm. Similarly the second through flow opening 45 and/or the further through flow opening 39 may also be defined as slit-shaped, wherein the width of the first through flow opening 27 increases in an upward direction from a first width of 2.5 mm to a second width of 5.4 mm.

Figure 11:
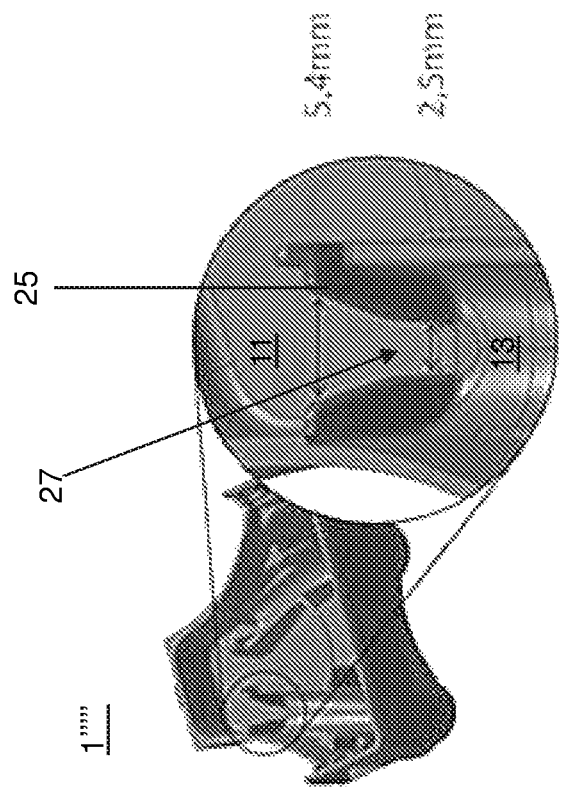
FIG. 11 shows a detailed perspective view of another beverage fluid dispensing head according to the invention.
Figure 12:
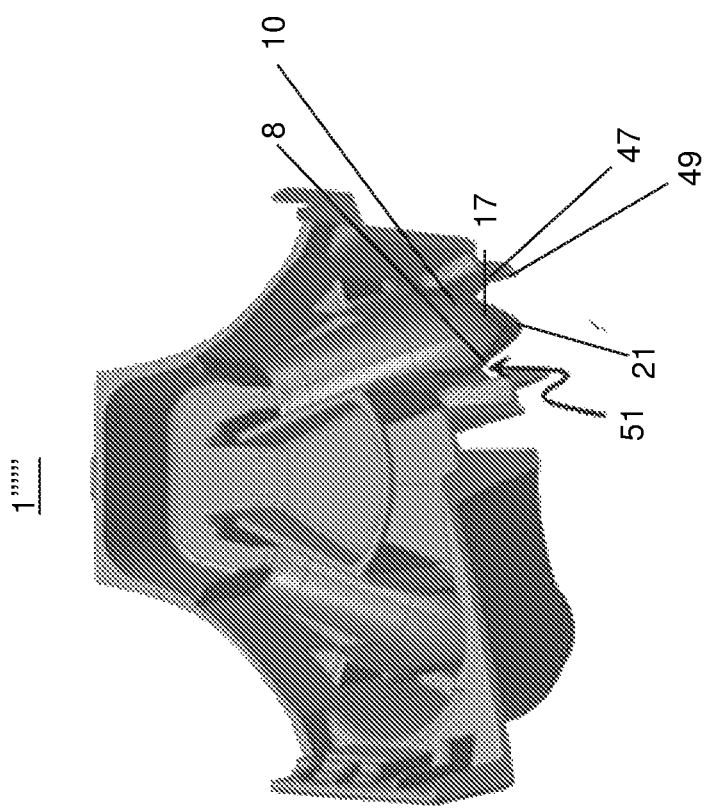
FIG. 12 shows a further detailed perspective view of the dispensing head according to FIG. 11.

FIGS. 11 and 12 show a perspective view of another embodiment of a dispensing head 1'''' of the beverage apparatus according to FIGS. 1A-1C. In the preceding Figures and FIGS. 11 and 12 corresponding elements are provided with the same reference number. Hereafter only differences between the dispensing head 1 of FIGS. 1A-1C and the dispensing head 1'''' of FIGS. 11 and 12 are discussed. In FIG. 11 the housing 3 is provided with a skirt element 47 which is formed by an upstanding edge 49 which is integral with the housing 3. The skirt element is provided around each tongue-shaped flow guide 17 and extends downwardly from the housing 3 till below the distal end 21 of its respective tongue-shaped flow guide 17. More in particular the skirt element 47 defines the contour of the opening 16, 18 in the bottom 20 of the housing 30 through which the tongue-shaped flow guide 17 extends.

In FIG. 12, which also provides a partial cross sectional view of the dispensing head 1'''', it can be seen that the inner surface of the skirt element 47 and the tongue-shaped flow guide 17 are spaced apart such as to be fluidly separated. Each of the upstanding edges 8, 10 which run along the length of the tongue-shaped flow guide 17 are further also spaced a minimal distance 51 away from the skirt element 47 in order to prevent the accidental bridging of a beverage fluid from the flow guide 17 to the skirt element 47. The invention is not limited to the above referred to embodiments. Wherever there is referred to a feature pertaining to each of the outlet channels 13, 15, this can be read as being also applicable to at least one outlet channel. For the purpose of clarity and a concise description features are described herein as part of the same or separate embodiments, however, it will be appreciated that the scope of the invention may include embodiments having combinations of all or some of the features described throughout the application. It will be clear to the skilled person that the invention is not limited to any embodiment herein described and that modifications are possible which may be considered within the scope of the appended claims. Additions, deletions, and modifications within the purview of the skilled person may generally be made without departing from the scope of the invention, as determined by the claims.

The invention claimed is:

1. A beverage fluid dispensing head comprising:
   a housing; and
   a fluid track, at least in part, arranged inside the housing, wherein the fluid track comprises:
      an inlet channel arranged for receiving a beverage fluid from a beverage apparatus;
      a collection chamber, fluidly connected to the inlet channel, for receiving the beverage fluid therefrom; and
      at least one outlet channel,
   wherein the at least one outlet channel is fluidly connected to the collection chamber for receiving the beverage fluid from the collection chamber,
   wherein a downstream part of the at least one outlet channel is formed as a tongue-shaped flow guide which is downwardly directed for, in use, guiding the received beverage fluid and submitting the received beverage fluid therefrom in the form of an integral fluid beam for dispensing,
   wherein the tongue-shaped flow guide has a first fluid guiding surface which forms an inward curvature, when viewed in a first horizontal cross-section, and
   wherein the tongue-shaped flow guide has a first and a second upstanding edge which are merged downstream of the first fluid guiding surface,
   wherein the upstanding edges form a second fluid guiding surface which forms an outward bulging, and
   wherein the first fluid guiding surface is nested in the second fluid guiding surface.

2. The dispensing head according to claim 1, wherein the tongue-shaped flow guide is arranged for, in use, receiving beverage fluid with an average flowrate within a range A of flowrates wherein the range A of flowrates is 0.4-6 ml/s.

3. The dispensing head according to claim 1, wherein the upstanding edges taper, at least in part, towards a distal end of the tongue-shaped flow guide.

4. The dispensing head according to claim 1, wherein each of the upstanding edges are beveled or kinked towards a distal end of the tongue-shaped flow guide.

5. The dispensing head according to claim 1, wherein the upstanding edges converge towards a distal end of the tongue-shaped flow guide.

6. The dispensing head according to claim 1, wherein a distal end of the tongue-shaped flow guide is formed as a single tip.

7. The dispensing head according to claim 1, wherein the inward curvature formed by the first fluid guiding surface of the tongue-shaped flow guide, when viewed in a first horizontal cross-section, has only one minimum in its horizontal curvature.

8. The dispensing head according to claim 1, wherein the first fluid guiding surface converges to a single point on a beverage fluid guiding face of the tongue-shaped flow guide, wherein the single point is upstream of a distal end of the tongue-shaped flow guide.

9. The dispensing head according to claim 1, wherein each of the upstanding edges of the tongue-shaped flow guide runs along the length of the tongue-shaped flow guide and extends, at least in part, in a non-vertical direction with respect to the first fluid guiding surface.

10. The dispensing head according to claim 1, wherein the housing is provided with at least one opening in a bottom thereof, wherein the at least one tongue-shaped flow guide extends through the at least one opening, wherein the shortest distance between the at least one opening and a distal end of the tongue-shaped flow guide is between 3-15 mm.

11. The dispensing head according to claim 1, wherein the first fluid guiding surface terminates at an angle between 0-10 degrees from vertical.

12. The dispensing head according to claim 1, wherein the at least one outlet channel is integral with the tongue-shaped flow guide.

13. The dispensing head according to claim 1, wherein part of the at least one outlet channel is formed as a chute having a downwards curvature toward the tongue-shaped flow guide.

14. The dispensing head according to claim 13, wherein the at least one outlet channel is also curved in its cross-section traverse to a flow direction of the at least one outlet channel.

15. The dispensing head according to claim 1, wherein the at least one outlet channel comprises a first flow restriction, wherein the first flow restriction comprises a first through flow opening.

16. The dispensing head according to claim 15, wherein the first flow restriction is a first upstanding wall which extends traverse to a flow direction.

17. The dispensing head according to claim 16, wherein at least a portion of the contour of the first through flow opening is defined by at least a portion of the upstanding wall.

18. The dispensing head according to claim 15, wherein the first through flow opening is slit-shaped having a width in the range of 2.0-6.0 mm.

19. The dispensing head according to claim 18, wherein the first through flow opening extends upwardly from a bottom edge of the first flow restriction.

20. The dispensing head according to claim 18, wherein the first through flow opening extends to a top edge of the first flow restriction.

21. The dispensing head according to claim 18, wherein the width of the first through flow opening increases in an upward direction.

22. The dispensing head according to claim 15, wherein the at least one outlet channel comprises a second flow restriction, wherein the second flow restriction comprises a through flow opening.

23. The dispensing head according to claim 22, wherein the second flow restriction is a second upstanding wall which extends traverse to a flow direction.

24. The dispensing head according to claim 23, wherein an outer surface of the second upstanding wall which faces an oncoming beverage fluid flow is angled between 2-5 degrees from vertical.

25. The dispensing head according to claim 23, wherein the second through flow opening is slit-shaped having a width in the range of 2.0-6.0 mm.

26. The dispensing head according to claim 23, wherein at least a portion of the contour of the second through flow opening is defined by at least a portion of the second upstanding wall.

27. The dispensing head according to claim 23, wherein the second through flow opening extends upwardly from a bottom edge of the second flow restriction.

28. The dispensing head according to claim 23, wherein the second through flow opening extends to a top edge of the second flow restriction.

29. The dispensing head according to claim 23, wherein the width of the second through flow opening increases in an upward direction.

30. The dispensing head according to claim 22, wherein the second flow restriction is arranged downstream of the first flow restriction.

31. The dispensing head according to claim 15, wherein the tongue-shaped flow guide comprises a further flow restriction, wherein the further flow restriction comprises a further through flow opening.

32. The dispensing head according to claim 31, wherein the further flow restriction is a further upstanding wall which extends traverse to a flow direction, wherein the further upstanding separation wall is angled between 0-10 degrees from vertical.

33. The dispensing head according to claim 1, wherein the housing is provided with a skirt element which extends downwardly from the housing and which is arranged around the tongue-shaped flow guide.

34. The dispensing head according to claim 33, wherein the inner surface of the skirt element and the tongue-shaped flow guide are spaced apart such as to be fluidly separated.

35. The dispensing head according to claim 33, wherein the skirt element extends till below the distal end of the tongue-shaped flow guide.

36. A system of a dispensing head according to claim 1 and a coffee apparatus with a beverage preparation unit for providing a beverage fluid to the dispensing head.

37. The system according to claim 36, wherein the beverage preparation unit is arranged to receive a coffee pad for brewing coffee at a pressure that is 0.7-3 bar above atmospheric pressure, or that the beverage preparation unit is arranged to receive a coffee capsule for brewing coffee at a pressure that is 1-20 bar above atmospheric pressure.

38. A beverage fluid dispensing head comprising:
 a housing; and
 a fluid track, at least in part, arranged inside the housing, wherein the fluid track comprises:
  an inlet channel arranged for receiving a beverage fluid from a beverage apparatus;
  a collection chamber, fluidly connected to the inlet channel, for receiving the beverage fluid therefrom; and
  at least one outlet channel,
 wherein the at least one outlet channel is fluidly connected to the collection chamber for receiving the beverage fluid from the collection chamber,
 wherein a downstream part of the at least one outlet channel is formed as a tongue-shaped flow guide which is downwardly directed for, in use, guiding the received beverage fluid and submitting the received beverage fluid therefrom in the form of an integral fluid beam for dispensing, wherein the tongue-shaped flow guide has a first fluid guiding surface which forms an inward curvature, when viewed in a first horizontal cross-section, and wherein the tongue-shaped flow guide has a first and a second upstanding edge which are merged downstream of the first fluid guiding surface, and wherein the upstanding edges form a second fluid guiding surface which forms an outward bulging, and wherein the second fluid guiding surface terminates at an angle between 0-10 degrees from vertical.

39. The beverage fluid dispensing head according to claim 38, wherein the first fluid guiding surface is nested in the second fluid guiding surface.

* * * * *